US009396536B2

(12) United States Patent
Kim et al.

(10) Patent No.: US 9,396,536 B2
(45) Date of Patent: Jul. 19, 2016

(54) CALIBRATION SYSTEM FOR STEREO CAMERA AND CALIBRATION APPARATUS FOR CALIBRATING STEREO IMAGE

(75) Inventors: Je Woo Kim, Seongnam-si (KR); Byeong Ho Choi, Yongin-si (KR); Dong Sun Kim, Seongnam-si (KR); Hyok Song, Gwangju-si (KR); Cheon Lee, Gwangju-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 304 days.

(21) Appl. No.: 14/116,458

(22) PCT Filed: Aug. 1, 2011

(86) PCT No.: PCT/KR2011/005642
§ 371 (c)(1),
(2), (4) Date: Nov. 8, 2013

(87) PCT Pub. No.: WO2012/165707
PCT Pub. Date: Dec. 6, 2012

(65) Prior Publication Data
US 2014/0118501 A1     May 1, 2014

(30) Foreign Application Priority Data
May 30, 2011     (KR) .................. 10-2011-0051519

(51) Int. Cl.
*G06T 7/00*     (2006.01)
*H04N 13/02*    (2006.01)

(52) U.S. Cl.
CPC ............ *G06T 7/002* (2013.01); *H04N 13/0239* (2013.01); *H04N 13/0296* (2013.01)

(58) Field of Classification Search
None
See application file for complete search history.

(56) References Cited

U.S. PATENT DOCUMENTS

| 6,643,396 B1* | 11/2003 | Hendriks | G01C 11/06 250/559.23 |
| 7,450,248 B2* | 11/2008 | Fujieda | G01B 11/24 356/601 |
| 8,564,655 B2* | 10/2013 | Fujieda | G01B 11/0691 348/87 |
| 2007/0146478 A1* | 6/2007 | Butler-Smith | H04N 5/262 348/47 |

(Continued)

FOREIGN PATENT DOCUMENTS

| KR | 10-2006-0063575 A | 6/2006 |
| KR | 10-2007-0055882 A | 5/2007 |

(Continued)

OTHER PUBLICATIONS

International Searching Authority International Search Report for PCT/KR2011/005642 dated Apr. 20, 2012.

*Primary Examiner* — Jay Patel
*Assistant Examiner* — Reza Aghevli

(57) ABSTRACT

A calibration system for stereo cameras includes a rig control module configured to, when a camera calibration parameter is input, control an auto rig according to the camera calibration parameter to perform physical calibration for a camera, a stereo image calibration apparatus configured to calibrate a stereo image to acquire the camera calibration parameter, and output the acquired camera calibration parameter, and a camera control module configured to output the camera calibration parameter, which is input from the stereo image calibration apparatus, to the rig control module, or screen-output the camera calibration parameter. Therefore, physical calibration and image processing calibration for a camera are performed in association with each other.

10 Claims, 2 Drawing Sheets

(56) References Cited

U.S. PATENT DOCUMENTS

| | | | | |
|---|---|---|---|---|
| 2010/0020178 A1* | 1/2010 | Kleihorst | ................ | G06T 7/002 348/175 |
| 2010/0079598 A1* | 4/2010 | Ke | ........................ | G01B 11/24 348/187 |
| 2010/0201809 A1* | 8/2010 | Oyama | .................... | G01C 3/14 348/135 |
| 2010/0232681 A1* | 9/2010 | Fujieda | ................... | G06T 7/002 382/154 |
| 2011/0122231 A1* | 5/2011 | Fujieda | ................ | G06T 7/0075 348/47 |

FOREIGN PATENT DOCUMENTS

| | | |
|---|---|---|
| KR | 10-0943719 B1 | 2/2010 |
| KR | 10-2011-0003611 A | 1/2011 |

* cited by examiner

CALIBRATION SYSTEM FOR STEREO CAMERA AND CALIBRATION APPARATUS FOR CALIBRATING STEREO IMAGE

CROSS REFERENCE TO RELATED APPLICATIONS

This application is a National Stage of International Application No. PCT/KR2011/005642 filed Aug. 1, 2011, claiming priority based on Korean Patent Application No. 10-2011-0051519 filed May 30, 2011, the contents of all of which are incorporated herein by reference in their entirety.

TECHNICAL FIELD

The present invention relates to a stereo camera system for acquiring a three-dimensional (3D) stereo image that is the mainstream of a next-generation broadcast and the digital contents industry, and more particularly, to a calibration system for acquiring a calibrated stereo image.

BACKGROUND ART

As technology for calibrating a stereo image, there is known technology that calibrates distortion (for example, a color distribution mismatch between a left image and a right image, lens distortion, and disparity distortion) of a stereo image acquired by a stereo camera, and thus enables a stereo image observer to comfortably observe a 3D image with no visual fatigue. The known technology for calibrating a stereo image mainly performs only calibration processing which includes image processing. That is, the technology does not perform calibration including physical adjustment such as adjustment of a binocular lens, adjustment of a separation distance between lenses, and convergence adjustment in a stereo camera, and due to this, the technology inevitably has a fundamental limitation in calibrating a stereo image.

DISCLOSURE

Technical Problem

Therefore, an object of the present invention is to provide technology that performs physical calibration of a stereo camera and image processing calibration of a stereo image, thus enhancing a distortion calibration result of the stereo image.

Technical Solution

In one general aspect, a calibration system for stereo cameras includes: a rig control module configured to, when a camera calibration parameter is input, control an auto rig according to the camera calibration parameter to perform physical calibration for a camera; a stereo image calibration apparatus configured to calibrate a stereo image to acquire the camera calibration parameter, and output the acquired camera calibration parameter; and a camera control module configured to output the camera calibration parameter, which is input from the stereo image calibration apparatus, to the rig control module, or screen-output the camera calibration parameter.

The stereo image calibration apparatus may include: a stereo color calibration module configured to perform color calibration for the stereo image; and a geometry calibration module configured to perform geometry calibration for the color-calibrated stereo image to generate a rectification stereo image, and analyze the generated rectification stereo image to acquire the camera calibration parameter.

The calibration system may further include a multiplexer configured to receive and output at least one of the color-calibrated stereo image and the rectification stereo image.

The stereo image calibration apparatus may further include a 3D depth information module configured to generate 3D depth information of the color-calibrated stereo image to output the 3D depth information to the multiplexer.

The camera control module may perform control such that color-calibrated stereo image is input to the geometry calibration module within a certain time after a change of a zoom magnification, in a camera setup mode or a camera capture mode.

In another general aspect, a stereo image calibration apparatus includes: a stereo color calibration module configured to perform color calibration for a stereo image; and a geometry calibration module configured to perform geometry calibration for the color-calibrated stereo image to acquire a camera calibration parameter which is used to perform physical calibration for a camera, and output the camera calibration parameter to a camera control module.

The geometry calibration module may include: a first rectification image generator configured to analyze the color-calibrated stereo image to generate a rectification stereo image; a second rectification image generator configured to generate a rectification stereo image through 2D warping of the color-calibrated stereo image on a basis of a camera parameter input from the camera control module; and a calibration parameter acquirer configured to analyze the rectification stereo image, which is generated by the first rectification image generator or the second rectification stereo image, to acquire a camera calibration parameter, and output the camera calibration parameter to the camera control module.

The stereo image calibration apparatus may further include a 3D depth information module configured to generate 3D depth information of the color-calibrated stereo image, and output the generated 3D depth information to a multiplexer which receives the color-calibrated stereo image.

Advantageous Effects

According to the present invention, the use of a camera is more efficiently and conveniently set. That is, the present invention measures an error between both camera lenses and an image sensor through rectification (calibration of horizontal, vertical, size, and rotation errors)-based image processing so as to calibrate an optical setting of a camera and a setting of a camera parameter in setting the camera before capturing, and informs a calibration value for the measured error through a feedback, thus enabling physical calibration of the camera to be easily performed.

Moreover, the present invention minimizes an error of physical calibration of a camera, and performs color calibration to calibrate image errors (an exposure error, a color error, a synchronization error, etc.) of a stereo image in real-time capturing, thereby acquiring a calibrated stereo image.

In addition, since a stereo image calibration apparatus includes a 3D depth information module that receives color-calibrated left and right images, the stereo image calibration apparatus extracts disparity vector and depth map information based on an object feature and a focus of a camera, thus enabling a cameraman or a stereographer to be easily view a composition of a stereo image.

BEST MODE

Further aspects of the present invention described above will be clarified through the following embodiments described with reference to the accompanying drawings. Hereinafter, embodiments of the present invention will be described in detail in order for those skilled in the art to easily understand and reproduce the present invention through the embodiments.

Figure 1:
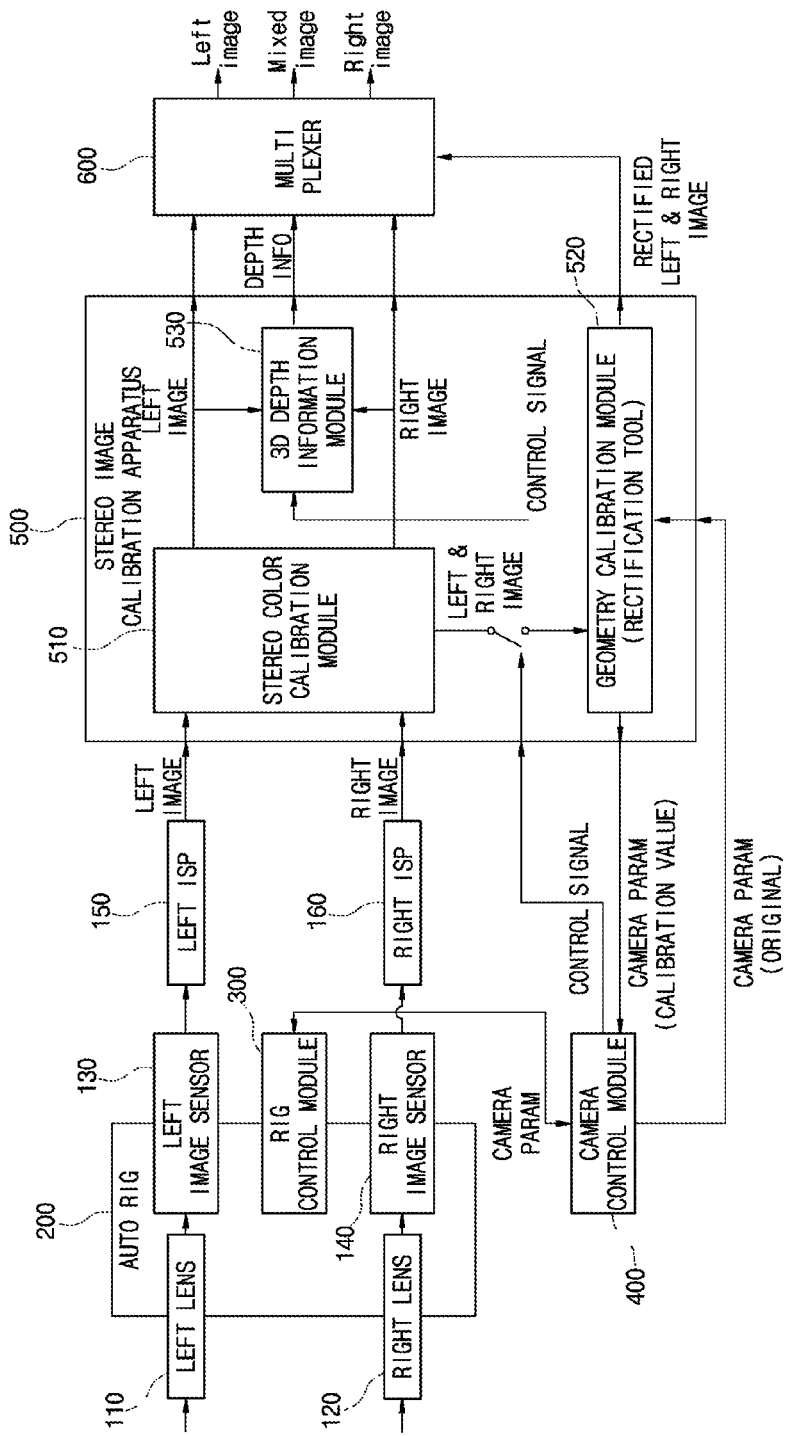
FIG. 1 is a block diagram illustrating a calibration system for stereo cameras according to an embodiment of the present invention.

FIG. 1 is a block diagram illustrating a calibration system for stereo cameras according to an embodiment of the present invention.

Referring to FIG. 1, the calibration system for stereo cameras according to an embodiment of the present invention includes: a left lens 110 that is an element of a stereo camera; a left image sensor 130 that recomposes light, passing through the left lens 110, into an image which is an electrical signal; a left image signal processor (ISP) 150 that signal-processes an output image of the left image sensor 130; a right lens 120; a right image sensor 140 that recomposes light, passing through the right lens 120, into an image which is an electrical signal; and a right ISP 160 that signal-processes an output image of the right image sensor 140. Here, the left lens 110, the left image sensor 130, the right lens 120, and the right image sensor 140 are mounted on an auto rig 200. Also, the calibration system for stereo cameras includes a rig control module 300 that controls the auto rig 200, a camera control module 400, and a stereo image calibration apparatus 500. Furthermore, the calibration system for stereo cameras further includes a multiplexer 600 that receives and outputs a stereo image calibrated by the stereo image calibration apparatus 500.

The rig control module 300 directly auto-controls the auto rig 200 to physically adjust a position and rotation angle of the left lens 110, the right lens 120, and the image sensors 130 and 140. In an embodiment, the rig control module 300 controls the auto rig 200 according to a camera calibration parameter input from the camera control module 400 to calibrate an error of the left lens 110, the right lens 120, and the image sensors 130 and 140. The camera control module 400 controls an overall operation of the calibration system for stereo cameras. That is, the camera control module 400 controls an operation of the rig control module 300 and the stereo image calibration apparatus 500, and controls an overall operation of a camera. The camera control module 400 outputs the camera calibration parameter, which is input from the stereo image calibration apparatus 500, to the rig control module 300, or outputs information of the camera calibration parameter to a viewfinder. The latter enables a user to visually check the camera calibration parameter information and physically calibrate a camera through manual manipulation. Also, the camera control module 400 transfers previously-acquired camera parameter information and information about a current status of a camera such as a camera setting and zoom-in/zoom-out to the stereo image calibration apparatus 500.

The stereo image calibration apparatus 500 is for calibrating a stereo image, and includes one or more processors that perform image processing calibration for a left image and a right image, acquire a camera calibration parameter, used to perform physical adjustment of a camera, from the calibrated result, and outputs the camera calibration parameter to the camera control module 400. According to an aspect of the present invention, the stereo image calibration apparatus 500 includes a stereo color calibration module 510 and a geometry calibration module 520. The stereo color calibration module 510 performs stereo color calibration for a stereo image which includes left and right images respectively input from the left and right ISPs 150 and 160. That is, the stereo color calibration module 510 calibrates an exposure error, color error, and synchronization error of the left and right images to perform match calibration of the stereo image.

The geometry calibration module 520 performs geometry calibration for the color-calibrated stereo image. In an embodiment, the geometry calibration module 520 calibrates the color-calibrated stereo image based on a rectification tool to generate a rectification stereo image, compares a left image and right image of the generated rectification stereo image to acquire a camera calibration parameter used to perform physical calibration for a horizontal error, vertical error, size error, rotation error, and focus error of a camera, and outputs the camera calibration parameter to the camera control module 400, in which case the geometry calibration module 520 optionally outputs the rectification stereo image to the multiplexer 600. The camera calibration parameter may be a parameter used to physically calibrate the left lens 110 and the left image sensor 130 with respect to the right lens 120 and the right image sensor 140, or may be a parameter used to physically calibrate the right lens 120 and the right image sensor 140 with respect to the left lens 110 and the left image sensor 130. That is, the geometry calibration module 520 compares the calibrated left image and the calibrated right image to acquire the camera calibration parameter.

In addition, the stereo image calibration apparatus 500 further includes a 3D depth information module 530. The 3D depth information module 530 generates a disparity vector and disparity information, calculates a 3D depth, and generates a 3D depth map, for some blocks (for example, 2×2 blocks, 4×4 blocks, or the like) of the stereo image obtained through the color calibration by the stereo color calibration module 510, and thus generates depth information of the 3D stereo image to output the depth information to the multiplexer 600. In an embodiment, the 3D depth information module 530 designates some blocks of the color-calibrated stereo image according to a control signal from the camera control module 400, and performs a process for generating 3D depth information.

The multiplexer 600 separately outputs the calibrated left image and right image which are input from the stereo color calibration module 510, or screen-outputs an image obtained by combining the left image and the right image. The multiplexer 600 includes an overlay function, and may overlay the depth information, which is input from the 3D depth information module 530, on the calibrated stereo image. Furthermore, when the rectification stereo image input from the geometry calibration module 520, the multiplexer 600 may overlay the rectification stereo image on the color-calibrated stereo image to output the overlaid images. Alternatively, the multiplexer 600 may overlay the color-calibrated stereo image on the rectification stereo image to output the overlaid images. At this time, the depth information may be overlaid on the images, and may be output. For reference, the reason that the color-calibrated stereo image and the rectification stereo image are simultaneously output is for enabling a user to visually check a degree of mismatch between the color-calibrated stereo image and the rectification stereo image.

Hereinafter, an overall operation in a camera mode will be described in detail with reference to FIG. 1. First, an operation in a camera setup mode which is set by the camera control module 400 will be described. A before-calibration clear stereo image generated from light is acquired by using the left and right lenses 110 and 120, the left and right image sensors 130 and 140, the left and right ISPs 150 and 160. The acquired before-calibration stereo image is input to the stereo color calibration module 510. The stereo color calibration module 510 performs color calibration for the input before-calibration stereo image. The color-calibrated stereo image is output to the multiplexer 600, and is also output to the 3D depth information module 530. Also, in the camera setup mode, as illustrated in FIG. 1, the camera control module 400 applies a control signal in order for an output of the stereo color calibration module 510 to be input to the geometry calibration module 520. Therefore, the color-calibrated stereo image is output to the geometry calibration module 520. The geometry calibration module 520 performs geometry calibration for the color-calibrated stereo image to generate the rectification stereo image, and compares a left image and right image of the rectification stereo image to acquire the camera calibration parameter. In an embodiment, the geometry calibration module 520 generates the rectification stereo image by using only the color-calibrated stereo image. In another embodiment, the geometry calibration module 520 generates the rectification stereo image by using the color-calibrated stereo image and the camera parameter which is input from the camera control module 400.

The geometry calibration module 520 outputs the camera calibration parameter to the camera control module 400, and optionally outputs the rectification stereo image to the multiplexer 600. The camera control module 400 screen-outputs the camera calibration parameter to the viewfinder, and transfers the camera calibration parameter to the rig control module 300. Alternatively, the camera control module 400 may perform only one of the screen-outputting of the camera calibration parameter and the transferring of the camera calibration parameter to the rig control module 300. The multiplexer 600 receives the color-calibrated stereo image, the 3D depth information, and the rectification stereo image, and overlays the 3D depth information and the rectification stereo image on the color-calibrated stereo image to screen-output the overlaid images. The rig control module 300 controls the auto rig 200 according to the camera calibration parameter input from the camera control module 400, in order to calibrate for a horizontal error, vertical error, size error, rotation error, and focus error of a camera. As described above, a stereo image is acquired after the camera is physically calibrated, and color calibration and geometry calibration are repeatedly performed such that the camera calibration parameter is within an allowable threshold value, thereby completing the physical calibration of the camera.

Next, an operation in a camera capture mode which is set by the camera control module 400 will be described in detail. A before-calibration clear stereo image generated from light is acquired by using the left and right lenses 110 and 120, the left and right image sensors 130 and 140, the left and right ISPs 150 and 160. The acquired before-calibration stereo image is input to the stereo color calibration module 510. The stereo color calibration module 510 performs color calibration for the input before-calibration stereo image. The color-calibrated stereo image is output to the multiplexer 600, and is also output to the 3D depth information module 530. The multiplexer 600 separately outputs the calibrated left image and right image which are input from the stereo color calibration module 510, or screen-outputs an image obtained by combining the left image and the right image. In this case, since the multiplexer 600 includes the overlay function, the multiplexer 600 may additionally express and screen-output the 3D depth information in addition to the color-calibrated left and right images.

In the camera capture mode, when changing a zoom magnification, the above-described operation in the camera setup mode is performed for some frames (for example, one to five frames) for a certain time, for example, within about 1 sec, after the change of the zoom magnification. That is, the camera control module 400 performs control such that an output of the stereo color calibration module 510 is input to the geometry calibration module 520 within a certain time after the change of the zoom magnification. Therefore, the color-calibrated stereo image is input to the geometry calibration module 520, which acquires the camera calibration parameter by using the rectification tool and transfers the camera calibration parameter to the camera control module 400. The auto rig 200 performs finely physical calibration of the camera. Accordingly, an accuracy of calibration for a stereo image can increase.

Figure 2:
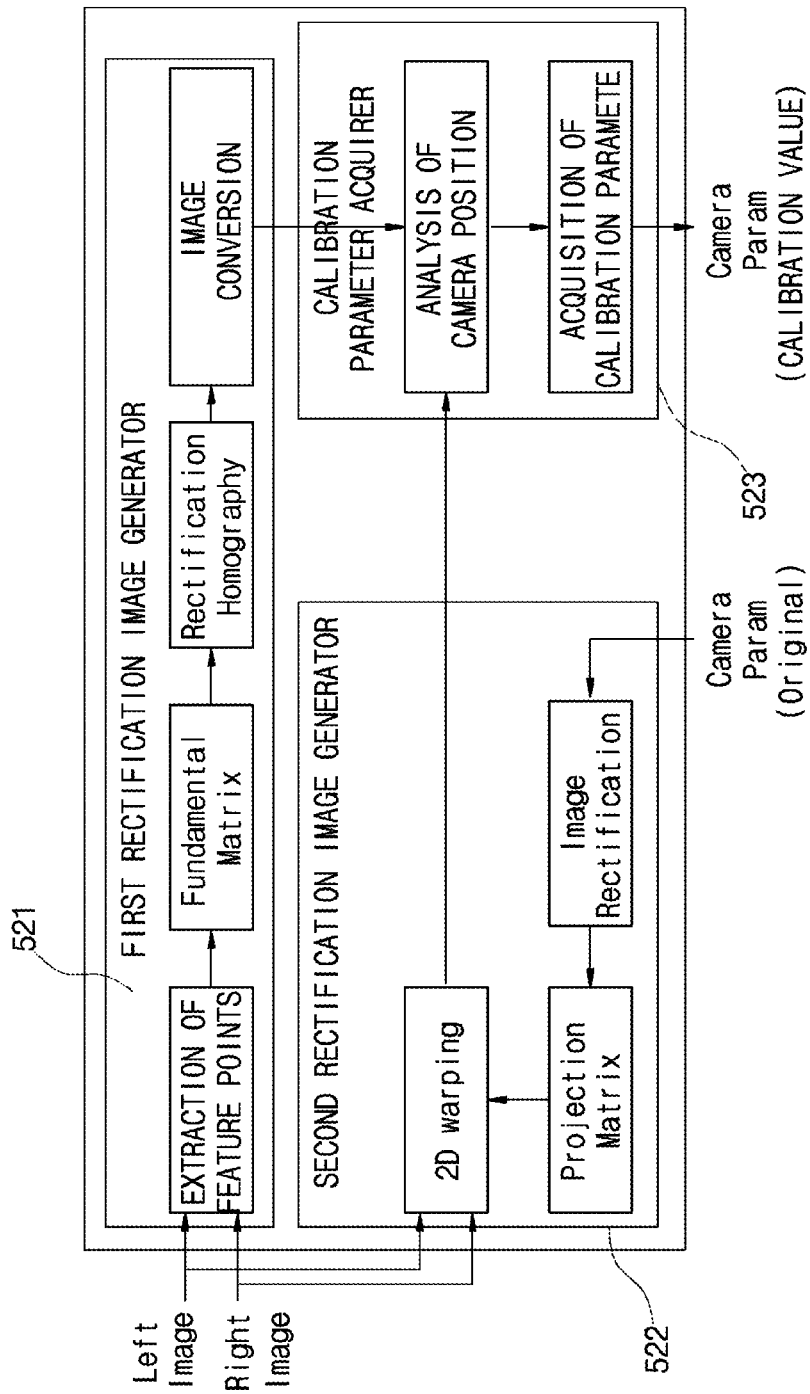
FIG. 2 is a block diagram illustrating a geometry calibration module according to an embodiment of the present invention.

FIG. 2 is a block diagram illustrating the geometry calibration module according to an embodiment of the present invention.

Referring to FIG. 2, the geometry calibration module 520 includes a first rectification image generator 521, a second rectification image generator 522, and a calibration parameter acquirer 523. The first rectification image generator 521 generates a rectification stereo image without using information about the camera parameter, and the second rectification image generator 522 generates a rectification stereo image by using the camera parameter. In detail, the first rectification image generator 521 extracts feature points of left and right images from the color-calibrated stereo image, generates a fundamental matrix and a rectification homography, and acquires the rectification stereo image through an image conversion operation. Such a scheme is called an uncalibrated rectification scheme. The second rectification image generator 522 receives an accurate camera parameter from the camera control module 400, and generates the rectification stereo image for the color-calibrated stereo image through two-dimensionally (2D) warping by using image rectification and a projection matrix. Such a scheme is called a calibrated rectification scheme.

In an embodiment, one of the first and second rectification image generators 521 and 522 performs a process for generating the rectification stereo image according to control by the camera control module 400. For example, when the camera parameter is input from the camera control module 400, the second rectification image generator 522 performs the process for generating the rectification stereo image, but when the camera parameter is not input, the first rectification image generator 521 performs the process for generating the rectification stereo image. The calibration parameter acquirer 523 compares a left rectification image and a right rectification image, which are generated by the first rectification image generator 521 or the second rectification image generator 522, to acquire the camera calibration parameter by analyzing a position of the camera. The calibration parameter acquirer 523 transfers the acquired camera calibration parameter to the camera control module 400.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A calibration system for stereo cameras, the calibration system comprising:
   a rig control module configured to perform physical calibration for a camera based on a camera calibration parameter by controlling an auto rig according to the camera calibration parameter;
   a stereo image calibration apparatus configured to calibrate a stereo image to acquire the camera calibration parameter, and output the acquired camera calibration parameter; and
   a camera control module configured to output the camera calibration parameter, which is input from the stereo image calibration apparatus, to the rig control module, or screen-output the camera calibration parameter,
   wherein the stereo image calibration apparatus comprises:
      a stereo color calibration module configured to perform color calibration for the stereo image; and
      a geometry calibration module configured to perform geometry calibration for the color-calibrated stereo image to generate a rectification stereo image, and analyze the generated rectification stereo image to acquire the camera calibration parameter.

2. The calibration system of claim 1, further comprising a multiplexer configured to receive and output at least one of the color-calibrated stereo image and the rectification stereo image.

3. The calibration system of claim 2, wherein the stereo image calibration apparatus further comprises a 3D depth information module configured to generate 3D depth information of the color-calibrated stereo image to output the 3D depth information to the multiplexer.

4. The calibration system of claim 3, wherein the camera control module performs control such that color-calibrated stereo image is input to the geometry calibration module within a certain time after a change of a zoom magnification, in a camera setup mode or a camera capture mode.

5. A stereo image calibration apparatus comprises:
   a stereo color calibration module configured to perform color calibration for a stereo image; and
   a geometry calibration module configured to perform geometry calibration for the color-calibrated stereo image to acquire a camera calibration parameter which is used to perform physical calibration for a camera, and output the camera calibration parameter to a camera control module which performs the physical calibration for the camera based on the camera calibration parameter,
   wherein the geometry calibration module comprises:
      a first rectification image generator configured to analyze the color-calibrated stereo image to generate a rectification stereo image;
      a second rectification image generator configured to generate a rectification stereo image through 2D warping of the color-calibrated stereo image on a basis of a camera parameter input from the camera control module; and
      a calibration parameter acquirer configured to analyze the rectification stereo image, which is generated by the first rectification image generator or the second rectification stereo image, to acquire a camera calibration parameter, and output the camera calibration parameter to the camera control module.

6. The stereo image calibration apparatus of claim 5, further comprising a 3D depth information module configured to generate 3D depth information of the color-calibrated stereo image, and output the generated 3D depth information to a multiplexer which receives the color-calibrated stereo image.

7. The calibration system of claim 1, wherein the camera control module performs control such that color-calibrated stereo image is input to the geometry calibration module within a certain time after a change of a zoom magnification, in a camera setup mode or a camera capture mode.

8. The calibration system of claim 2, wherein the camera control module performs control such that color-calibrated stereo image is input to the geometry calibration module within a certain time after a change of a zoom magnification, in a camera setup mode or a camera capture mode.

9. The calibration system of claim 3, wherein the camera control module performs control such that color-calibrated stereo image is input to the geometry calibration module within a certain time after a change of a zoom magnification, in a camera setup mode or a camera capture mode.

10. The stereo image calibration apparatus of claim 6, further comprising a 3D depth information module configured to generate 3D depth information of the color-calibrated stereo image, and output the generated 3D depth information to a multiplexer which receives the color-calibrated stereo image.

* * * * *